United States Patent
Khandekar et al.

(10) Patent No.: US 8,363,607 B2
(45) Date of Patent: Jan. 29, 2013

(54) VOIP GROUP RESOURCE MANAGEMENT

(75) Inventors: Aamod Khandekar, San Diego, CA (US); Alexei Gorokhov, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 11/852,997

(22) Filed: Sep. 10, 2007

(65) Prior Publication Data

US 2008/0062178 A1 Mar. 13, 2008

Related U.S. Application Data

(60) Provisional application No. 60/843,804, filed on Sep. 11, 2006.

(51) Int. Cl.
*H04Q 7/00* (2006.01)
*H04B 7/216* (2006.01)
*H04L 12/28* (2006.01)
*H04J 3/18* (2006.01)

(52) U.S. Cl. ......... 370/329; 370/342; 370/441; 370/477

(58) Field of Classification Search .................. None
See application file for complete search history.

(56) References Cited

U.S. PATENT DOCUMENTS

| 6,363,242 | B1* | 3/2002 | Brown et al. ............... 455/70 |
| 6,434,133 | B1 | 8/2002 | Hamalainen |
| 6,504,829 | B1* | 1/2003 | Young et al. ............... 370/337 |
| 2002/0114309 | A1* | 8/2002 | Chow et al. ............... 370/347 |
| 2005/0207342 | A1 | 9/2005 | Tanabe et al. |
| 2007/0217370 | A1* | 9/2007 | Soong et al. ............... 370/337 |
| 2007/0230412 | A1* | 10/2007 | McBeath et al. ............ 370/338 |
| 2007/0274288 | A1* | 11/2007 | Smith et al. ............... 370/351 |
| 2008/0025247 | A1 | 1/2008 | McBeath et al. |
| 2008/0089354 | A1* | 4/2008 | Yoon et al. ............... 370/432 |
| 2008/0259895 | A1* | 10/2008 | Habetha et al. ............ 370/338 |

FOREIGN PATENT DOCUMENTS

| EP | 0917317 | | 5/1999 |
| EP | 1282241 | | 2/2003 |
| EP | 1608192 | A1 | 12/2005 |
| EP | 1679932 | A1 | 7/2006 |
| JP | 2005512370 | A | 4/2005 |

(Continued)

OTHER PUBLICATIONS

C.S0084-002-0, Medium Access Control Layer for Ultra Mobile Broadband (UMB) Air Interface Specification, 3GPP2 C.S0084-002-0, Apr. 2007, pp. I-9-8, XP002470204.

(Continued)

*Primary Examiner* — Xavier Szewai Wong
(74) *Attorney, Agent, or Firm* — Howard Seo

(57) ABSTRACT

Group resource management is provided utilizing assignment of resources in a persistent manner, which involves assigning a channel and resources to a user device for a specified interval while allowing users within the group to be multiplexed dynamically. A first bitmap is created that is a function of the number of users in the group and the number of channels assigned to that group. A second bitmap is created that has a number of bits equal to a number of "on" bits contained in the first bitmap. The second bitmap can assign a rate option or a size option, which is a function of a profile of a group member that corresponds to the bit. The rate option and size option can be indicated in each x-bit position in the second bitmap Both broadcast and multicast are supported.

46 Claims, 10 Drawing Sheets

FOREIGN PATENT DOCUMENTS

| | | |
|---|---|---|
| JP | 2008035526 A | 2/2008 |
| RU | 2226315 C2 | 3/2004 |
| WO | WO03049005 | 6/2003 |
| WO | WO2005096558 A1 | 10/2005 |
| WO | 2007078173 | 7/2007 |
| WO | 2007124675 | 11/2007 |

OTHER PUBLICATIONS

International Search Report, PCT/US07/078189, International Search Authority, European Patent Office, Mar. 7, 2008.

Written Opinion, PCT/US07/078189, International Search Authority, European Patent Office, Mar. 7, 2008.

International Preliminary Report on Patentability—PCT/US2007/078189—International Search Authority—European Patent Office—Dec. 15, 2008.

China Unicom, et al., Joint Proposal for 3GPP2 Physcial Layer for FDD Spectra; c30-20060731-04OR4 [Online] Jul. 31, 2006, pp. 1-84, XP002468555, URL:http://www3gcnorg/3gpp2/TSGC/Working/2006/2006-07-Montreal/TSG-C-2006-07-31-Montreal/WG3/> [retrieved on Feb. 11, 2008].

\* cited by examiner

VOIP GROUP RESOURCE MANAGEMENT

CROSS-REFERENCE

This application claims the benefit of U.S. Provisional Application Ser. No. 60/843,804, filed Sep. 11, 2006, entitled "VOIP GROUP RESOURCE MANAGEMENT FOR LBC FDD," the entirety of which is incorporated herein by reference.

BACKGROUND

I. Field

The following description relates generally to wireless communication systems and more particularly to scheduling and managing group resources in a wireless communication network.

II. Background

Wireless communication systems are widely deployed to provide various types of communication content such as voice, data, and other content. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project Long Term Evolution (3GPP LTE) systems, orthogonal frequency division multiple access (OFDMA) systems, and so forth.

Generally, a wireless multiple-access communication system can simultaneously support communication for multiple wireless terminals. Each terminal communicates with one or more base stations through transmissions on the forward and reverse links. The forward link (or downlink) refers to the communication link from base stations to the terminals, and the reverse link (or uplink) refers to the communication link from the terminals to the base stations. This communication link may be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Generally, there are a large number of users that can access a system at any time. Each of these users needs to be scheduled and provided resources. With a large number of users, if every packet needs to be scheduled, a large amount of resources need to be dedicated to this scheduling. In addition, each packet contains information relating to the scheduling, which requires system resources and contributes to the amount of information that needs to be transmitted.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection group setup message and bitmap encoding for VoIP group resource allocation and management. Multiplexing of various forward link assignments on a per frame basis to minimize partial loading caused by traffic activity is enabled. Statistical multiplexing of Voice over Internet Protocol (VoIP) traffic can be increased, and VoIP can be multiplexed with other traffic types. The various embodiments can enable certain flexibility of rate and bandwidth assignment within multiplexed resources. Additionally, statistical multiplexing of bandwidth and power can be improved by combining two PHY frames into a "VoIP frame" with a common group definition.

Provided is a method for group resource management. The method comprises creating a group of members, wherein each member comprises at least one user device and assigning each group member a position within a first bitmap in a persistent fashion. The method also includes indicating a rate option or size option in a second bitmap as a function of a profile of each group member and transmitting the first bitmap and the second bitmap to the group.

Another aspect relates to a wireless communications apparatus that includes a processor and a memory that stores information generated by the processor. The processor executes instructions for creating a group of members and assigning a position in a first bitmap to each group member. The processor can also execute instructions for including a rate option or a size option in a second bitmap as a function of a profile of each group member and sending the first bitmap and the second bitmap to the group.

In a related aspect is a wireless communications apparatus that facilitates group resource management. The apparatus includes a means for establishing a group of members, wherein each member comprises at least one user device. Also included is a means for assigning each group member a position within a first bitmap and a means for indicating a rate option or size option in a second bitmap as a function of a profile of each group member. A means for conveying the first bitmap and the second bitmap to the group is also included in apparatus.

Another aspect relates to a machine-readable medium having stored thereon machine-executable instructions for establishing a group of member user devices and generating a first bitmap equal to the number of group members, measured in bits, and assigning each group member a position within a first bitmap. A second bitmap equal to the number of "on" bits in the first bitmap is produced and indicates a rate option or size option in the second bitmap as a function of a profile of each group member. The instructions include transmitting the first bitmap and the second bitmap to the group.

A further related aspect in a wireless communication system is an apparatus comprising a processor. The processor is configured to create a group of member user devices and produce a first bitmap equal to the number of group members, measured in bits, and assigning each group member a position within a first bitmap. The processor is further configured to generate a second bitmap equal to the number of "on" bits in the first bitmap indicating a rate option or size option in the second bitmap as a function of a profile of each group member and communicate the first bitmap and the second bitmap to the group.

Another aspect relates to a method for selectively determining assigned resources. The method includes receiving a first bitmap in a VoIP frame, wherein the first bitmap is intended for a group of user device members identified by a group identification. An assigned position within the first bitmap is located and a second bitmap is selectively receiving. The method also includes determining a rate option or a size option included in the second bitmap based in part on the assigned position within the first bitmap.

A further aspect is a wireless communications apparatus, comprising a processor and a memory that stores information generated by the processor. The processor executes instructions for receiving a first bitmap in a VoIP frame, wherein the first bitmap is intended for a group of user device members identified by a group identification. The processor also executes instructions for detecting an assigned position within the first bitmap, selectively receiving a second bitmap, and identifying a rate option or a size option included in the second bitmap based in part on the assigned position within the first bitmap.

Still another aspect relates to a wireless communications apparatus that includes a means for receiving a first bitmap in a VoIP frame, wherein the first bitmap is intended for a group of user device members identified by a group identification. A means for locating an assigned position within the first bitmap and a means for selectively receiving a second bitmap, and a means for determining a rate option or a size option included in the second bitmap based in part on the assigned position within the first bitmap are also included in apparatus.

A further aspect relates to a machine-readable medium having stored thereon machine-executable instructions for determining assigned resources. The instructions include receiving a first bitmap in a VoIP frame, wherein the first bitmap is intended for a group of user device members identified by a group identification, and locating an assigned position within the first bitmap. A second bitmap is selectively received depending on if the assigned position within the first bitmap is set to "1" or "0". The instructions also include determining a rate option or a size option included in the second bitmap based in part on the assigned position within the first bitmap, wherein the rate option or size option is indicated in each x-bit position in the second bitmap.

A related aspect in a wireless communication system is an apparatus comprising a processor configured to receive a first bitmap in a VoIP frame, wherein the first bitmap is intended for a group of user device members identified by a group identification. The processor is also configured to determine an assigned position within the first bitmap, receive a second bitmap depending on if the assigned position within the first bitmap is set to "1" or "0", and ascertain a rate option or a size option included in the second bitmap based in part on the assigned position within the first bitmap, wherein the rate option or size option is indicated in each x-bit position in the second bitmap.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
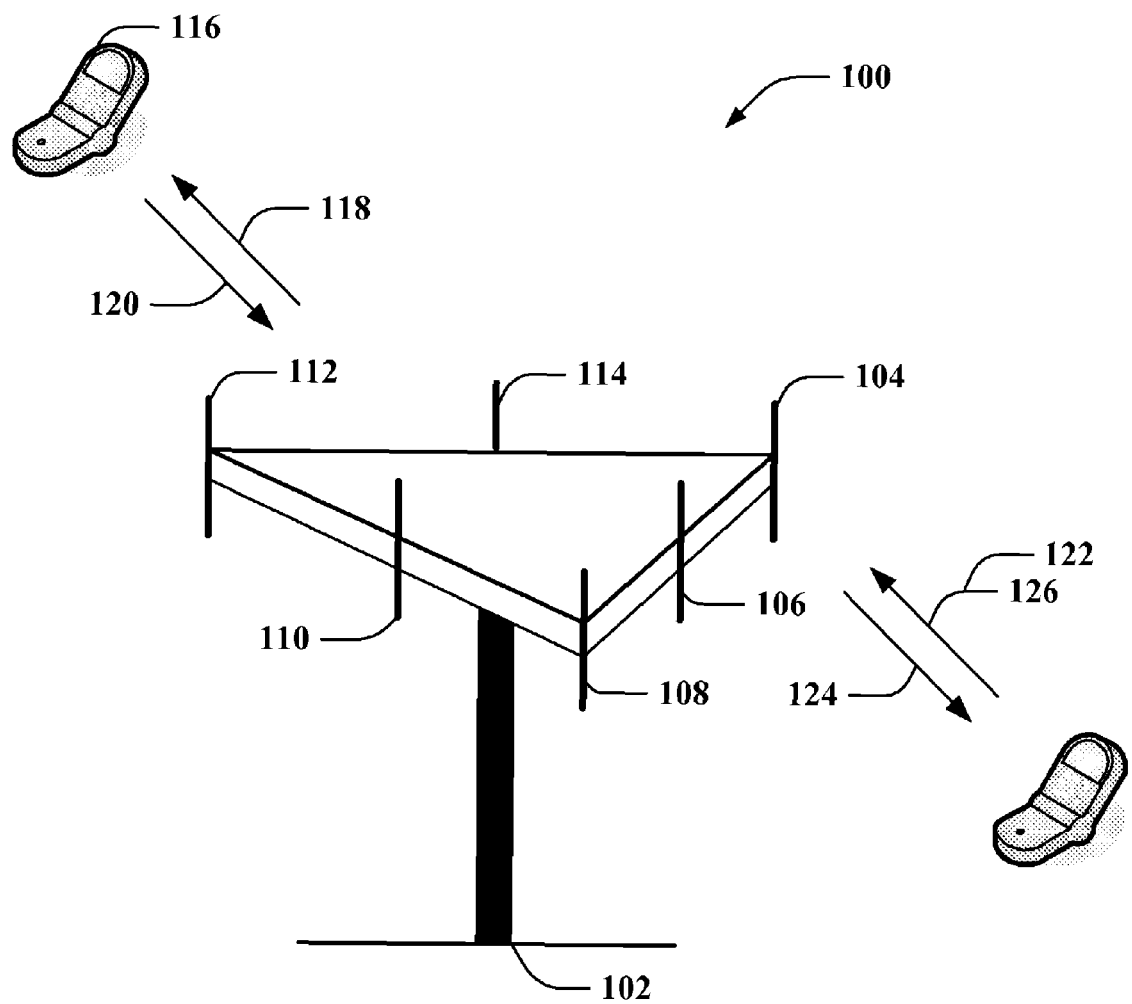
FIG. 1 illustrates a multiple access wireless communication system for group resource management.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

With reference now to the drawings, FIG. 1 illustrates a multiple access wireless communication system 100 for group resource management. System 100 can facilitate assignment of resources in a persistent manner, which involves assigning a channel and resources to a user device for a specified interval while allowing users within the group to be multiplexed dynamically. Thus, each time a packet is sent to the user device, information relating the channel assignment does not need to be sent, unless the specified interval has expired (e.g., the channel has been de-assigned) and a new channel needs to be assigned. While the various aspects disclosed herein relate to increasing statistical multiplexing of VoIP traffic; the aspects can also provide multiplexing of VoIP with other traffic types.

In further detail, system 100 includes an access point 102 (AP) that can include multiple antenna groups, one including 104 and 106, another including 108 and 110, and an additional group including 112 and 114. In FIG. 1, only two antennas are illustrated for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal 122 is in communication with antennas 106 and 108, where antennas 106 and 108 transmit information to access terminal 122 over forward link 124 and receive information from access terminal 122 over reverse link 126. In a FDD system, communication links 118, 120, 124 and 126 may use different frequencies for communication. For example, forward link 118 may use a different frequency then that used by reverse link 120.

Each group of antennas and/or the area in which they are designed to communicate is often referred to as a sector of the access point. As illustrated, antenna groups can be designed to communicate to access terminals in a sector of the areas covered by access point 100.

In communication over forward links 118 and 124, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, a user device, terminal, wireless terminal, access terminal or some other terminology.

Access point 102 can be configured to transmit to either or both access terminals 116 and 124 information relating to a channel assigned to each access terminal. The transmission can be multicast or broadcast. The information relating to channel assignment can be sent in a persistent manner, wherein each access terminal 116 and 124, upon successful receipt of the information utilizes that assigned channel for a predetermined amount of time or until a different channel is provided for use by that particular access terminal. In such a manner, access terminal 102 can serve a large number of access terminals 116 and 124, which can be part of a group of users, at substantially the same time while mitigating the need to schedule or provide resources each time a packet is sent to each access terminal 116 and 124. Thus, system 100 can provide multiplexing of various forward link assignments on a per frame bases to mitigate partial loading caused by traffic activity.

The various aspects disclosed herein can allow flexibility of resource assignment to a group of users. Preferred selection of resources can be assigned to a group.

Figure 2:
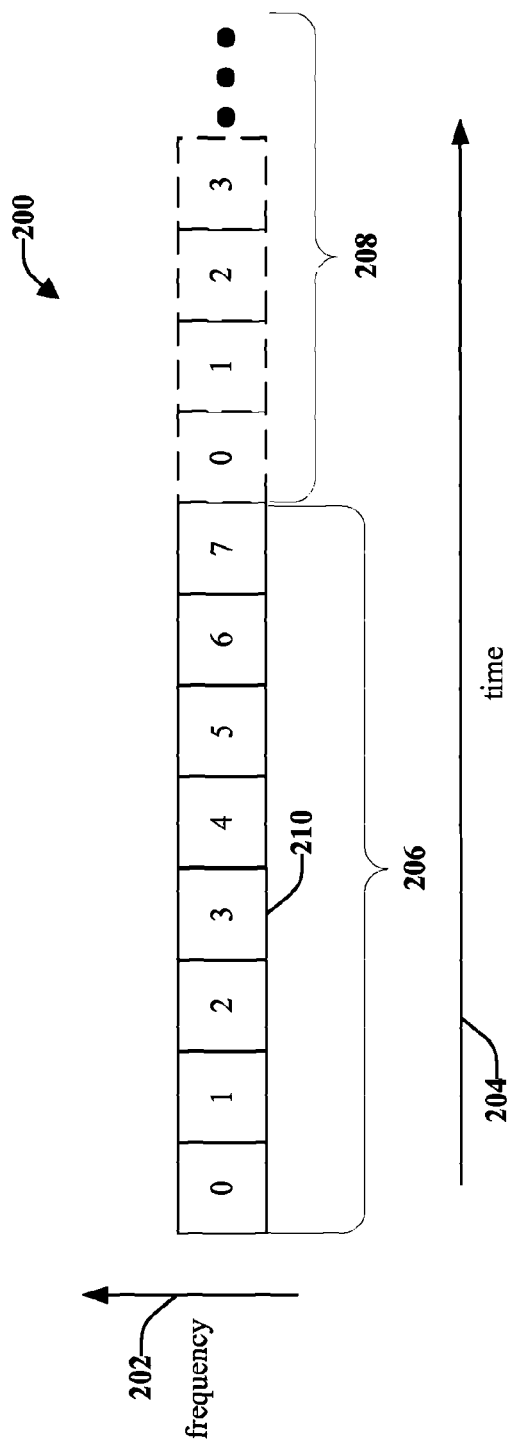
FIG. 2 illustrates an example OFDMA sub-structure.

To more fully appreciate the disclosed aspects, an OFDMA system will be briefly described. FIG. 2 illustrates an example OFDMA sub-structure 400. The vertical axis 202 illustrates frequency and the horizontal axis 404 illustrates time. There are eight slots or interlinks, illustrated at 406, labeled "0" through "7". This sequence repeats, as illustrated at 208. In the frequency domain, there are channels. Each channel, one of which is illustrated at 210, can include sixteen tones (minimum channels) over eight OFDM symbols (e.g., this channel is eight symbols). The total bandwidth can depend on location. For example, in a 5 MHz OFDMA system, there are 512 tones with generally 480 tones available due to some tones used as guard tones. The available tones are divided into channels, wherein each channel is sixteen tones.

The channels are sent to the various users, which can be included in a group, wherein each user is characterized or identified by a Mac Identification (ID). Therefore, in a group of G users, where G is an integer, the group will be identified as $\{MacID_1 \ldots MacID_G\}$. Each group member can be a single user (MacID) or a mulicast user (defined by a set of MacIDs). There are also K number of channels "C", where K is an integer. Thus the channels can be referred to as $\{C_1$ though $C_K\}$. Thus, the group is defined by the set of users $\{MacID_1 \ldots MacID_G\}$ and the set of channels $\{C_1$ though $C_K\}$. This signifies that at any given point in time the set of users maps to the set of channels. The set of channels can be less than the set of user because, statistically, only about 50% of the users are active at any moment.

However, the moment that the user decodes the packet cannot be identified because of Hybrid Automatic RepeatreQuest (H-ARQ). When a packet is sent to the user, if the packet or data frame is successfully decoded a positive acknowledgement (ACK) is sent to the transmitting device. If the packet is not successfully decoded, a retransmission request (e.g., more redundancy bits) is sent. A timeout, which provides a reasonable interval for the receiver to respond with an ACK can be provided. If the ACK is not received by sender 302 before expiration of the time, the sender 202 resends the data frame, provided a predetermined number of attempts has not been exceeded.

There are at least two sources of variability: the first is when the receiver terminates and the second is during periods of inactivity (this second source of variability will be discussed below with reference to FIG. 3). When a user (e.g., receiving device) terminates, the number of transmissions needed is variable since it depends on channel and interference conditions, which is not predictable at the receiving device.

Figure 3:
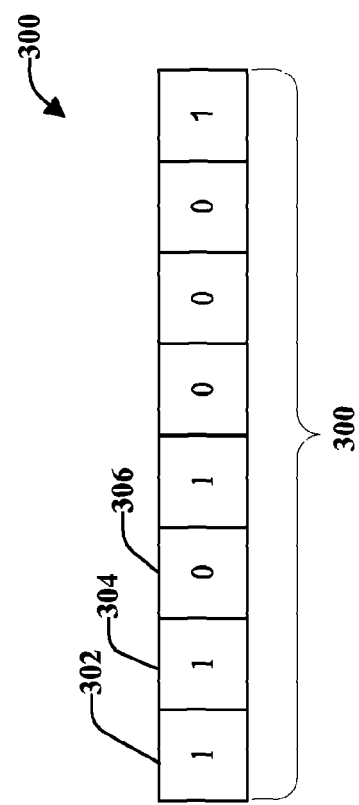
FIG. 3 illustrates a bitmap in accordance with the disclosed aspects.

To illustrate further, FIG. 3 depicts a bitmap 300 in accordance with the disclosed aspects. Each position, a representative few are labeled at 302, 304 and 306, can be assigned to a different user device (or receiver). Information relating to the position or block assigned to the user device can be transmitted once per interval (e.g., every 20 milliseconds). A block size can be the minimum granularity of group resources measured in units of base node per PHY frame. The number of blocks in a group assignment can span a certain number of base nodes across a VoIP frame. It should be understood that bitmap 300 is illustrated having eight bits, however, there can be any number of bits transmitted.

As discussed above, there are at least two sources of variability. The first source of variability is when the receiver terminates and the second is during periods of inactivity. For example, if there are 300 users, statistically on average, only half of the users will be transmitting at a time. Thus, group resource management can create a bitmap 300 after the group is identified.

The size of the bitmap is G, which represents the number of users or MacIDs (of which only eight are illustrated). If in a given frame, there is a transmission intended for a user with $MacID_1$, then the first bit 302 is set to "1". If a user with $MacID_2$ is to be transmitted information, the second bit 304 is set to "1". If a third user, having $MacID_3$ does not have any data, such as if he terminated early, the packet for that user goes into a silence period and the bit 306 associated with that user is set to inactive or "0", and so on.

The bitmap 300 is broadcast by the base station so that each user in the group can modulate. If a user device receives a bitmap, first the user device evaluates its position within the bitmap to determine whether a packet is intended for it (e.g., bit set to "0" or "1"). In addition, the user device determines how many set bits ("1"s) are prior to it on the bitmap. The number of set bits before the bit position of the user device indicates the channel the user device will be utilizing to receive the packet.

Bitmap encoding can include joint encoding of bitmaps. In this joint encoding, bitmap 1 and bitmap 2 (if present) can be encoded in a single codeword. A bitmap segment can be carried over forward-link control segments within PHY frames of the VoIP frame. In accordance with some aspects, two PHY frames can be combined into a "VoIP frame" with a common group definition to improve statistical multiplexing of bandwidth and power. In a UMB system, a bitmap segment can replace a certain number of forward link shared code channel (F-SCCH) segments, which are a set of modulation symbols allocated to carry a Link Assignment Block (LAB). User devices that are unaware of the presence and size of a bitmap segment can demodulate forward link control segments successfully.

The location and order of F-SCCH segments replaced by a bitmap segment can be specified in a group setup message. With a large number of F-SCCH segments, which can be used in scenarios where group transmission is used, some user devices will be demodulating a limited number of F-SCCH segments based on the device's capability. With this flexibility, scheduling can designate any selection of F-SCCH segments used for bitmaps, thus avoiding certain segments needed for some user devices.

In accordance with some aspects, a bitmap segment can be encoded with spectral efficiency of F-SCCH. An encoding of around 1 bps/Hz can achieve a good tradeoff of bandwidth/power overhead.

Figure 4:
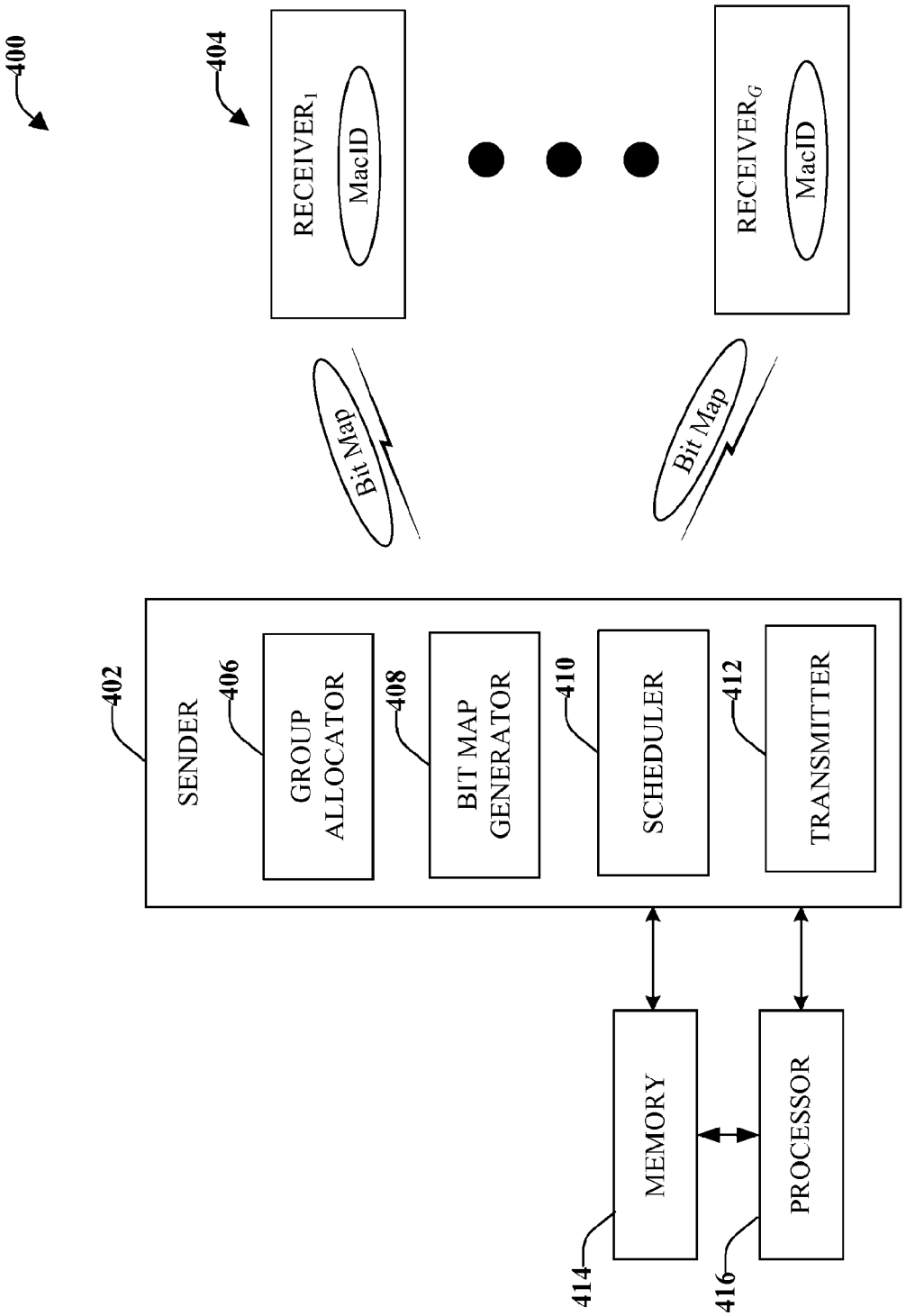
FIG. 4 illustrates an example system for group resource allocation.

FIG. 4 illustrates an example system 400 for group resource allocation. Each user device can be assigned to a group of user devices and an assignment of resources for that group in a persistent manner, which can be utilized to mitigate sending information relating to assignment with each packet. System 400 includes a sender 402, which can be an access point, and receivers, which can be user devices. Receivers are labeled $Receiver_1$ through $Receiver_G$, where G is an integer, and referred to collectively as receivers 404.

To facilitate group resource allocation, sender 402 can include a group allocator 406 that can be configured to identify a group of receivers (e.g., members) and assign a group identifier (Group ID). The Group ID can be utilized to identify the group for subsequent updates of group parameters, such as group members, resources assigned to the group, and so forth. The group can be characterized at a high-level by a number of receivers or sets of receivers. Information relating to which group each user belongs to and positioning can be communicated to each receiver. Each receiver 404 can be identified by a unique MAC Identifier (MacID). For example, if there is a group of users identified by group allocator 406 that consists of G users, then there will be a number of MacIDs labeled $\{MacID_1 \ldots MacID_G\}$. The units of group resources assigned to sets of users (e.g., MacIDs) can support both broadcast and multicast. Each user can be a single user (MacID) or a multicast set (defined by a set of MacIDs), thus, both broadcast and multicast can be accommodated.

Group allocator 406 can also be configured to identify a group based on a set of channels "C" in addition to the set of users. For example, there are K number of channels, where K is an integer. Thus there are a number of channels "C" from 0 to K, which can be labeled $\{C_1 \ldots C_K\}$. Thus, group allocator 406, at any point in time, can map the group of receivers to the group channels.

At all times for a given frame, each receiver might not receive a packet. On average, only about fifty percent of the receivers will be active and the other receivers will be inactive. In an OFDM system, for example, when a user device is active, it sends and receives packets about every 20 milliseconds. For example, if there are 300 receivers in the group, statistically at any time only around 150 users (50%) will be active (e.g., transmitter has a packet to deliver). Thus, the number of channels can be less than the number of receivers. If system 400 needs to schedule each individual packet received about every 20 milliseconds for each of the 150 users, the scheduling overhead is high.

Transmitter 402 also includes a bitmap generator 408 that can be configured to assign each receiver 404 to a bit or position on a first bitmap. Thus, each user in the group is assigned a position on the bitmap. A group member index, which can be created by group allocator 406, can define a position for each group member (e.g., one receiver) within a bitmap. Whichever bit (e.g., position on the bitmap) the receiver 404 is assigned to represents the resource that the receiver 404 can use for a predetermined amount of time (e.g., assigning resources in a persistent fashion).

Multiple choices of rate or assignment size can be accommodated by system 400. A second bitmap can be generated to indicate choice of rate or assignment size. The rate or assignment size can be chosen from "rate profile" or "size profile", which consists of multiple rate options and multiple size options respectively. The rate and size profiled can be communicated through a group setup message. For example, a rate profile can be suitable for VoIP traffic and a size profile can be suitable for best effort (BE) traffic. Each profile can include up to four options. In accordance with some aspects, 2 bits per group member in a Bitmap 2 is provided to signal a preferred option.

A scheduler 410 can be configured to selectively encode the first bitmap by setting particular bit to "0" or "1", depending on whether the receiver assigned to that position has a packet. The number of bits in the second bitmap can be equal to the number of "1" bits in the first bitmap. Receiver 402 can determine whether a packet is to be expected and the estimated amount of time before that packet arrives based on whether the bit is set to "0" or "1" and the number of bits positioned before the assigned bit that set to "1". Further information relating to the receiver will be described below with reference to FIG. 5.

A transmitter 412 can be configured to transmit the bitmaps and/or packets. In accordance with some aspects, the bitmap is sent at substantially the same time as the packet, included within the packet or transmitted separately. Upon receipt of the bitmap, each receiver reads the bitmap and determines where its assigned position is "set" (e.g., "1"), which indicates that there is a packet for that receiver. If the position is not "set" (e.g., "0"), it indicates that there is not a packet for that receiver. If the bit is set, that receiver counts how many positions are set before its position. This allows receiver to determine the resources it is using because not only is the group assigned from a certain set of users, but also certain resources that are "set."

System 400 can include memory 414 operatively coupled to sender 402. Memory 414 can store information related to a group identification, a group member index, and the member profile generated by the processor. The group identification identifies the group for a subsequent update of group parameters and the group member index defines a position for each group member with a first bitmap. In accordance with some aspects, memory 414 can store information related to groups of user devices, assignment of resources, scheduling of users and other suitable information related to group resource management in a communication network. A processor 416 can be operatively connected to sender 402 (and/or memory 414) to execute instructions relating to assigning group resources having a rate option or size option as a function of a generated profile for each member contained in the group.

In accordance with some aspects, processor can execute instructions relating to analysis of information related to group resource management in a communication network. Processor 414 can execute instructions for creating a first bitmap having a length (measured in bits) that is equal to a number of group members, assigning a position in the first bitmap for each group member, selectively setting the position to indicate if the corresponding group member is on or off in a current VoIP frame, and transmitting the first bitmap in each VoIP frame. The position is set to "on" if a packet is transmitted to the corresponding group member and set to "off" if there is not a packet transmitted to the corresponding group member in the current VoIP frame. Additionally, processor 414 can execute instructions for transmitting the first bitmap on a Shared Signaling Channel (F-SCCH) having its own index, wherein the F-SCCH index is transmitted as part of a group set-up message Processor 414 can execute instructions, in accordance with some aspects, for creating a second bitmap having a length (measured in x-bit units, where x is an integer and can vary) that is equal to the number of on-bits in the first bitmap and indicating the rate option or size option in each x-bit position in the second bitmap. The absence of a second bitmap can be indicated by a null size and a default rate option or a default size option can apply to each group member in the absence of a second bitmap.

Processor 416 can be a processor dedicated to analyzing and/or generating information received by transmitter 402 (e.g., MacID information, location of user devices, packets to be communicated to user devices, and so forth). Processor 416 can also be a processor that controls one or more components of system 400, and/or a processor that both analyzes and generates information received by transmitter and controls one or more components of system 400.

Memory 414 can store protocols associated with assigning user devices to a group, creating a Group ID, capturing and/or retaining MacIDs, taking action to control communication between transmitter 402 and receiver 404, etc., such that system 400 can employ stored protocols and/or algorithms to achieve group resource management in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 414 of the disclosed embodiments are intended to comprise, without being limited to, these and other suitable types of memory.

Figure 5:
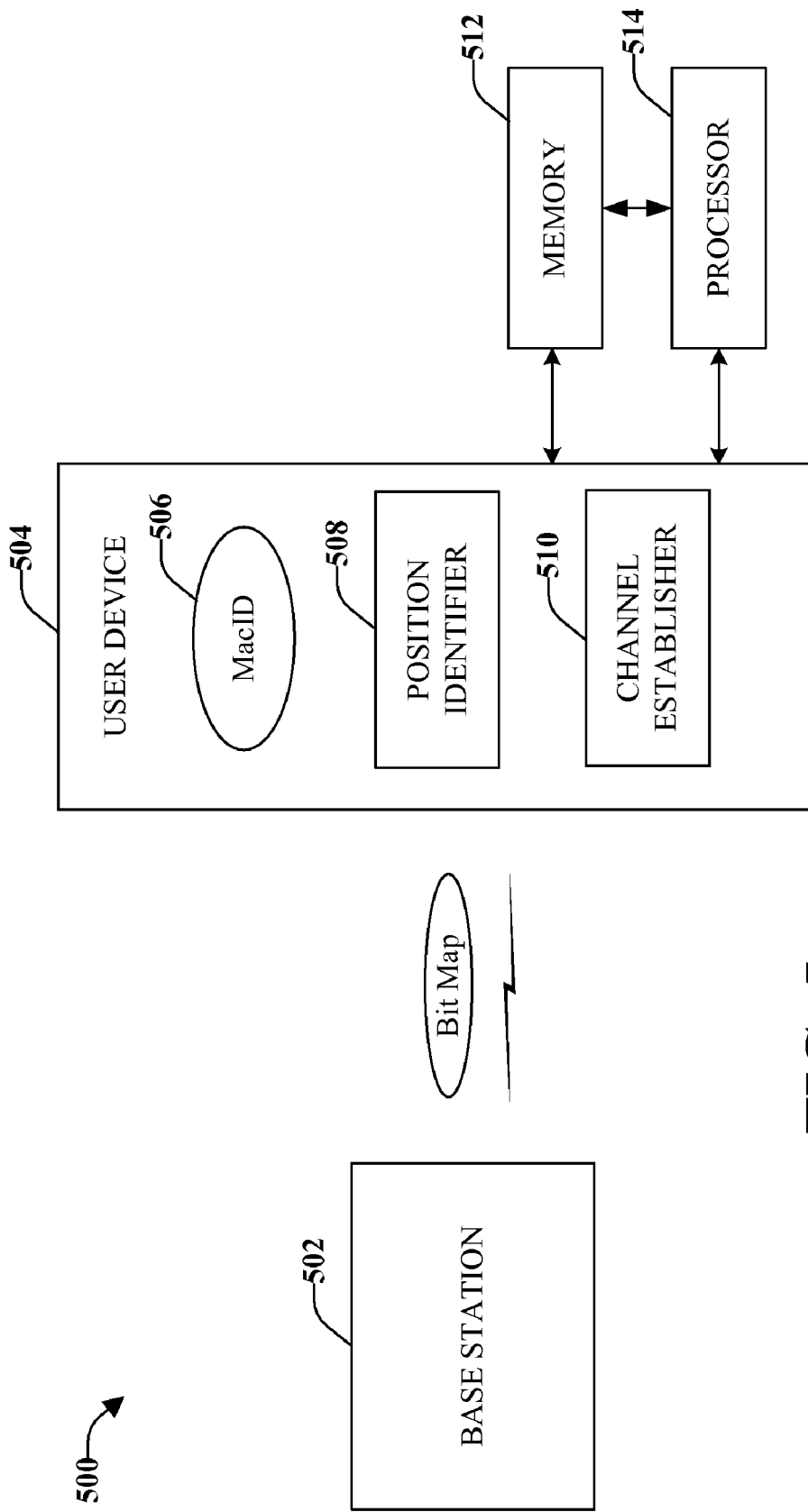
FIG. 5 illustrates an example system for group resource management.

FIG. 5 illustrates an example system 500 for group resource management. System 500 can be configured to assign resources for a group of wireless terminals, wherein the assignment is represented as a bitmap that is decoded by respective devices in order to determine available resources. Utilizing a bitmap can mitigate assigning and conveying the assignment of resources each time a packet is to be sent to a receiving device, thus mitigating the amount of information that needs to be transmitted.

System 500 can include a base station 502 and multiple receivers or user devices 504 (only one is illustrated) that are in wireless communication. Associated with each receiver can be a unique MacID 506. User device 504 can be included with a multitude of other receives within a group, identified by transmitter 502 and assigned a group identifier or other means of identifying the group. Transmitter 502 can be configured to schedule each user within the group and encode the scheduling information within a bitmap, which can be transmitted to indicate a persistent schedule for each user device 504 in the group. The schedule can remain the same (e.g., each wireless terminal is assigned the same resource) for a particular length of time. After expiration of the time, a new scheduling might be created for the group. This new scheduling can be conveyed to the user devices 504 that utilize the old scheduling until information relating to the new schedule is received.

Base station 502 can broadcast a bitmap 508 so that every user device 504 within the group (not shown) can modulate. In order to facilitate receipt of packets, user device 504 can include a position identifier 508 that can be configured to determine, upon receipt of a bitmap, its position within the bitmap. The position within the bitmap might have already been communicated in a previous transmission. Thus, position identifier 508 evaluates the position assigned to user device 504 and determines whether user device 504 is to receive a packet. Such a determination can be made by determining whether there is a "0" or a "1" assigned to the respective position in the bitmap. If the position is set to "0", there is no packet being sent to user device 504. If the position is set to "1", it indicates that there is a packet being transmitted to user device 504.

If the position is set to "1", a channel establisher 510 can determine how many channels will be used before the packet is received at user device 504. Such a determination can include evaluating the number of positions that are set to "1" prior to the position of user device 504. The number of positions indicates which channel to use. Thus, depending on the number of positions set to "1", channel establisher 510 can determine which channel user device 504 will be locked into.

System 500 can include memory 512 operatively coupled to user device 504. Memory 512 can store information related to a MacID assigned and an assigned position. A processor 514 can be operatively connected to user device 504 (and/or memory 512) and can execute instructions for receiving a first bitmap in a VoIP frame, wherein the first bitmap is intended for a group of user device members identified by a group identification, detecting an assigned position within the first bitmap, selectively receiving a second bitmap, and identifying a rate option or a size option included in the second bitmap based in part on the assigned position within the first bitmap. The rate option or size option is indicated in each x-bit position in the second bitmap. The rate profile can provides multiple rate options based on a profile of a corresponding group member. The size profile can provide multiple assignment size options based on a profile of a corresponding group member. Processor 514 can further execute instructions for determining if the assigned position within the first bitmap is set to "1" or "0". If the position is set to "1", the second bitmap is accepted. If the position is set to "0", the second bitmap is ignored.

In accordance with some aspects, processor 514 can execute instructions for determining an assigned position within a current VOIP frame, ascertaining if the position is "on" or "off", and selectively determining a current channel for the current VoIP frame if the assigned position is set to "on". The position is set to "on" if a packet for the corresponding group member is included in the current VoIP frame. The position is set to "off" if a packet for a corresponding group member is not included in the current VoIP.

Processor 514 can further determine a position within a first bitmap, a scheduling included in the bitmap, a number of bits set to "1" or "on" that are ahead of user device's position, and other suitable information related to managing group resources in a communication network. In accordance with some aspects, processor 514 facilitates analysis of information related to group resource management in a communication network. Processor 514 can be a processor dedicated to analyzing and/or generating information received by user device 504, a processor that controls one or more components of system 500, and/or a processor that both analyzes and generates information received by user device 504 and controls one or more components of system 504.

Memory 512 can store protocols associated with generating acknowledgments, receiving scheduling information, taking action to control communication between user device 504 and base station 502, etc., such that system 500 can employ stored protocols and/or algorithms to achieve group resource management in a wireless network as described herein.

Figure 6:
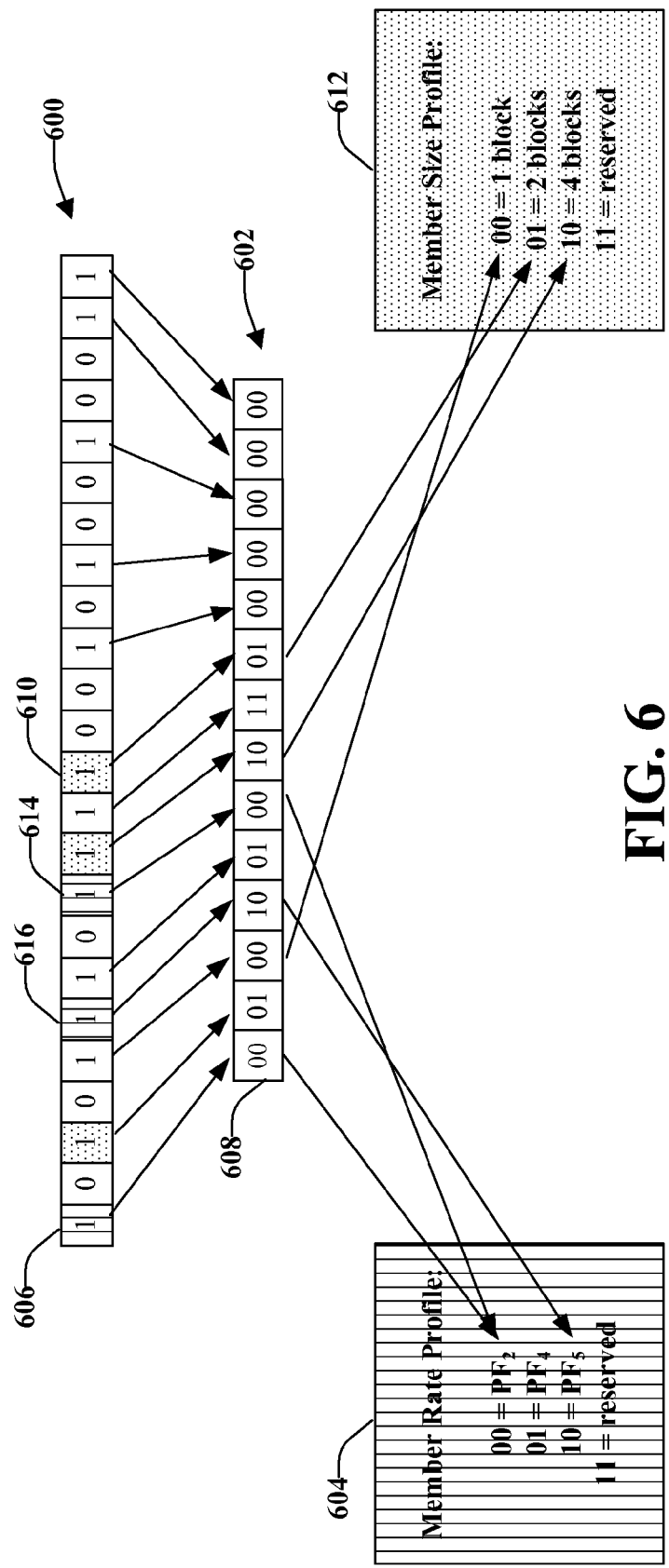
FIG. 6 illustrates another example bitmap.

With reference now to FIG. 6, are example bitmaps. The first bitmap 600 is considered a Bitmap 1. Group setup message fields can take a few different lengths and rates. Bitmap 1 (600) has a length that is equal to the number of group members, measured in bits. Bitmap 1 (600) is transmitted each VoIP frame. Each position in Bitmap 1 (600) indicates that corresponding group member is on ("1") or off ("0") in the current VoIP frame.

A Bitmap 2 (602) has a length that is equal to the number of on-bits in Bitmap 1 (600), measured in x-bit units. The absence of Bitmap 2 is indicated with a null size. Each 2-bit position in Bitmap 2 (602) indicates a rate or size option depending on the profile of the corresponding group member. When Bitmap 2 (602) is absent, default rate and size apply, which are the rate option and size option for group member. Thus, there is flexibility of rate and bandwidth assignment within multiplexed resources.

The rate profile can define a vector of four packet formats, which are illustrated at 604. As illustrated, 00=$PF_2$, 01=$PF_4$, 10=$PF_5$, and 11 can be reserved. In further detail, position 1 (606) is mapped to packet 00 (608), which has the member rate profile "00=$PF_2$", shown in block 604. The position indicated at 610 is mapped to channel "10", which is =$PF_5$.

A size profile can define a vector of four channel sizes in terms of the number of blocks (e.g., 1 block, 2 blocks, 4 blocks), as indicated at 612. Thus, the position indicated at 614 can be mapped to channel "01", which is 2 blocks and the position indicated at 616 can be mapped to channel "10", which is 4 blocks. It should be noted that mapping to channel "01" and channel "10" are used as examples and the actual mapping is not limited to this example.

The group setup message can also specify the resources on which the bitmap is to be transmitted. The bitmap may be transmitted on the Shared Signaling Channel (SCCH), which can carry multiple blocks, each having its own index. In accordance with an aspect, each SCCH block may have an index that consists of two integers, denoted by the pair (m,n). In accordance with another aspect, the SCCH block index may be given by a single integer m. The SCCH block index may be included in the group setup message so as to enable the mobile device to decode the bitmap efficiently.

A unicast/multicast group member indicates to the user device whether it is assigned a unicast or multicast position. In the case of a multicast position, data transmission on group resources is not acknowledge by the user device and proceeds for the default maximum number of transmissions.

Acknowledgement of H-ARQ transmissions within the group can follow existing rules and can utilize existing R-ACKCH resources. A baseline can be a channel based R-ACKCH. Each base node on the forward link tress can be associated with a R-ACKCH. The user device can send an acknowledgement on R-ACKCH associated with the lowest NodeID at the base level within its assignment.

Each block can include an integer number of base nodes on any PHY frame of the VoIP frame. A unicast group member (user device) can use an R-ACKCH associated to the lowest NodeID within the blocks assigned to this group member. Changes to an existing acknowledgement mechanism are not necessary.

Figure 7:
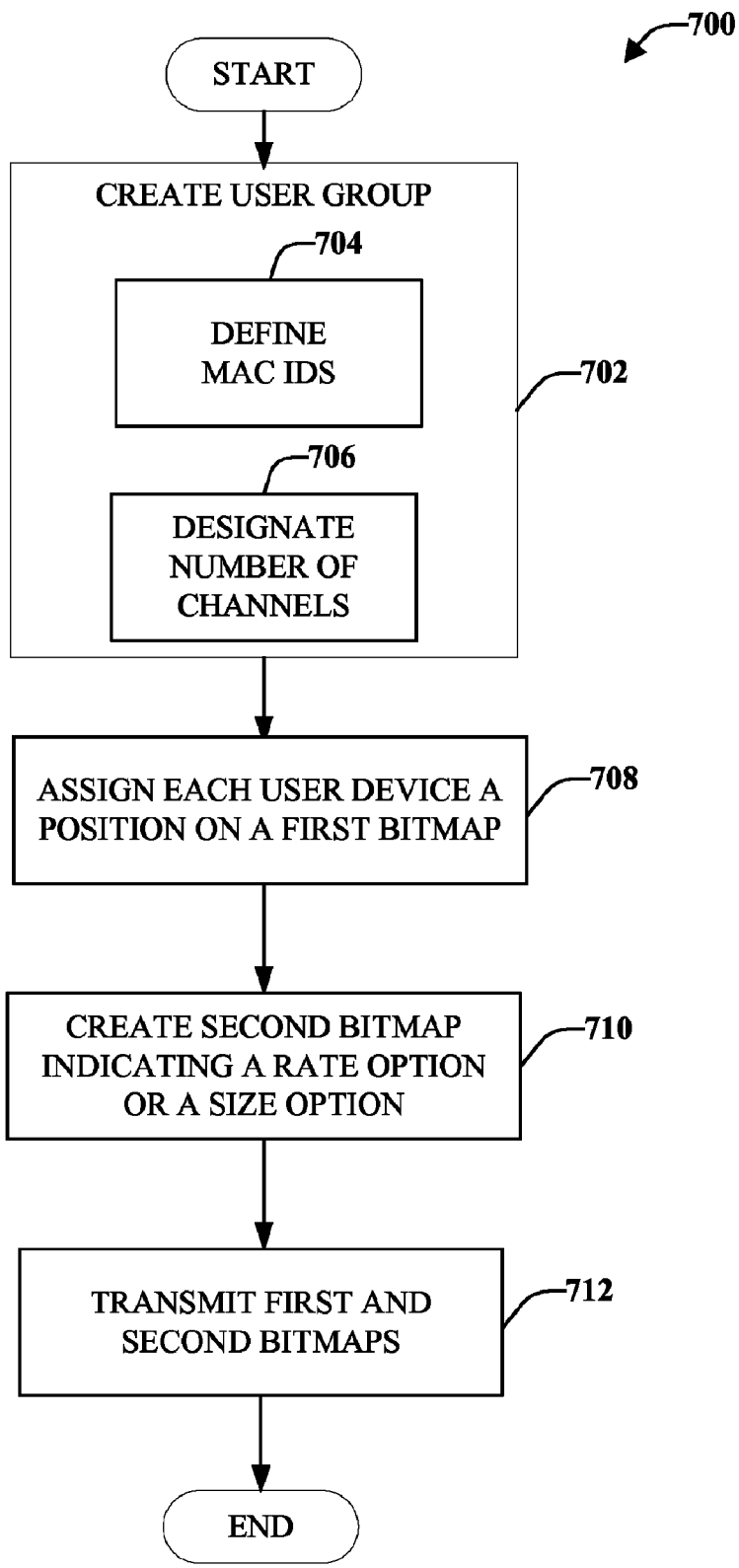
FIG. 7 illustrated is a method for serving many users at substantially the same time while mitigating the need to schedule every packet to every user.
Figure 8:
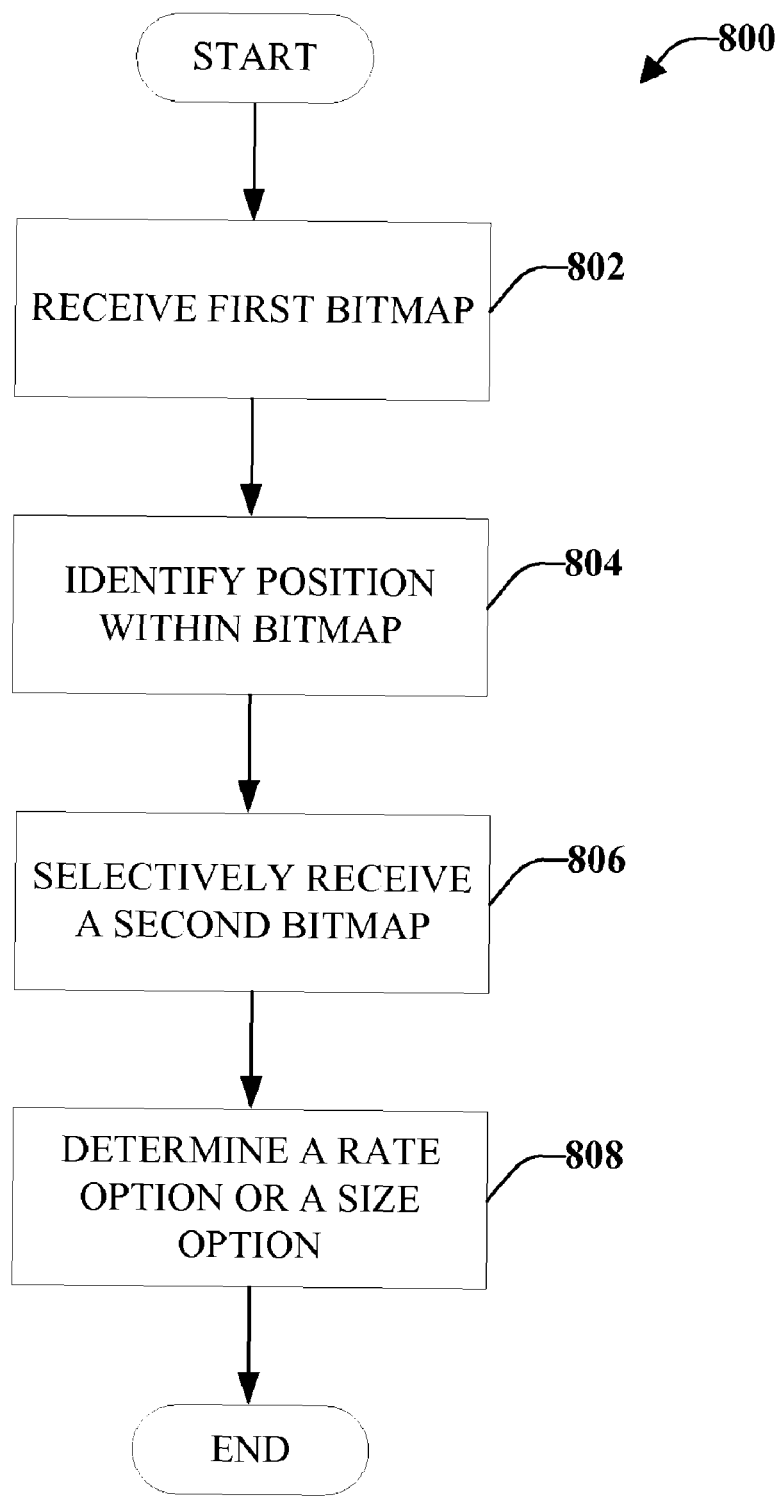
FIG. 8 illustrates a method for determining assigned resource based on a group assignment.

In view of the exemplary systems shown and described above, methodologies that may be implemented in accordance with the disclosed subject matter, will be better appreciated with reference to the flow charts of FIGS. 7 and 8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

With reference to FIG. 7, illustrated is a method 700 for serving many users at substantially the same time while mitigating the need to schedule every packet to every user. Method 700 can facilitate VoIP group resource management. Method 700 starts, at 702, a user group is created that includes users (e.g., user devices) that can be designed through various means (e.g., location, broadcast, multicast, and so forth). Creating the user group can include defining, at 704, the MacIDs associated with each user in the group, wherein each user device is defined by a MacID and a multicast set of user devices is defined by a set of MacIDS. The number of MacIDs associated with the group of user devices can be determined. The group can also be defined by designing a number of channels, at 706. The number of channels does not have to be the same as the number of users since, on average, only about fifty percent of the user devices will be active at any time. Each group member can be defined a position on a first bitmap, at 708. A group member index can be defined based on the positioning of each group member within the first bitmap. The first bitmap can be provided for assigning resources in a persistent fashion while allowing users within the group to be multiplexed more dynamically. The first bitmap can equal the number of group members (e.g., use devices), measured in bits.

A determination can be made whether a packet is intended for a particular user ID (e.g., single user device or multicast set), which can be identified by its MacID. Depending on whether or not a packet or transmission is intended for a user devices, a bit in the first bitmap is selectively set to either active ("1") or inactive ("0"). If a packet is intended for the user device, the bit associated with the particular user devices is set to active or "1". If a packet is not intended for the user device, the bit associated to that particular device is set to inactive "0".

At 710, a second bitmap is created that can indicate a rate option or a size option as a function of a profile of each group member. The number of bits included in the second bit map can be equal to the number of "on" bits in the first bitmap. The rate option or size option can be indicated in each x-bit position in the second bitmap. The absence of the second bitmap can be indicated by a null size. If there is no second bitmap, a default rate option or a default size option is assigned for each group member.

The first bitmap and the second bitmap are transmitted to the group of users, at 712. The bitmap can be used as assignment of resources in a persistent manner, wherein a user device is associated with a particular resource for a particular interval, after which the resources might change for that device.

In accordance with some aspects, a first bitmap (Bitmap 1) is created that has a length equal to the number of group members. This first bitmap can be created before assigning each group member a position. This first bit map can be encoded to indicate if a corresponding group member (e.g., based on position) is "on" (e.g., has a packet) or "off" (e.g., does not have a packet) in a current VoIP frame. The first bitmap can be transmitted in each VoIP frame.

A second bitmap (Bitmap 2) can be provided in accordance with some aspects. The second bitmap can be created by determining the number of "on" bits in the first bitmap and utilizing that number as the length of the second bitmap. A profile of each group member can be determined. A rate option or size option in each 2-bit position in the second bitmap can be indicated as a function of the profile of each group member.

If a second bitmap is not provided, it can be indicated by a null size for the second bitmap. Without a second bitmap, a default rate option and size option for each group member can apply.

FIG. 8 illustrates a method 800 for determining assigned resource based on a group assignment. Method 800 starts, at 802, when a first bitmap is received intended for a group of users that are identified by respective MAC IDs and a number of channels. The number of bits within the first bitmap can be equal to the number of members within a group, wherein the group is identified by a GroupID. The position within the bitmap associated with a respective user device is determined, at 804. The position can be included to assign resources in a persistent manner. A determination is made whether the bit assigned to the device is set to "1" or to "0". If the bit is set to "0", it indicates that there is no packet to be transmitted to the device. If the bit is set to "1", then it indicates that there is a packet intended for the device and a channel that the device is to use for that packet is determined. The channel can be determined by calculating the number of bits that are active, or set to "1" in the bitmap before the channel.

At 806, a second bitmap can be selectively received based on whether there is a packet intended for the user device in a current VoIP frame. If there is a packet (e.g., corresponding bit set to "1"), the second bitmap is received. If there is no packet (e.g., corresponding bit set to "0"), the second bitmap is ignored.

A rate option or size option included in the second bit map is determined, at 808. The rate option provides multiple rate options and the size option provides multiple assignment size options. The rate option or size option is based on a profile of a corresponding group member (e.g., the member assigned to the corresponding position on the first bitmap).

Figure 9:
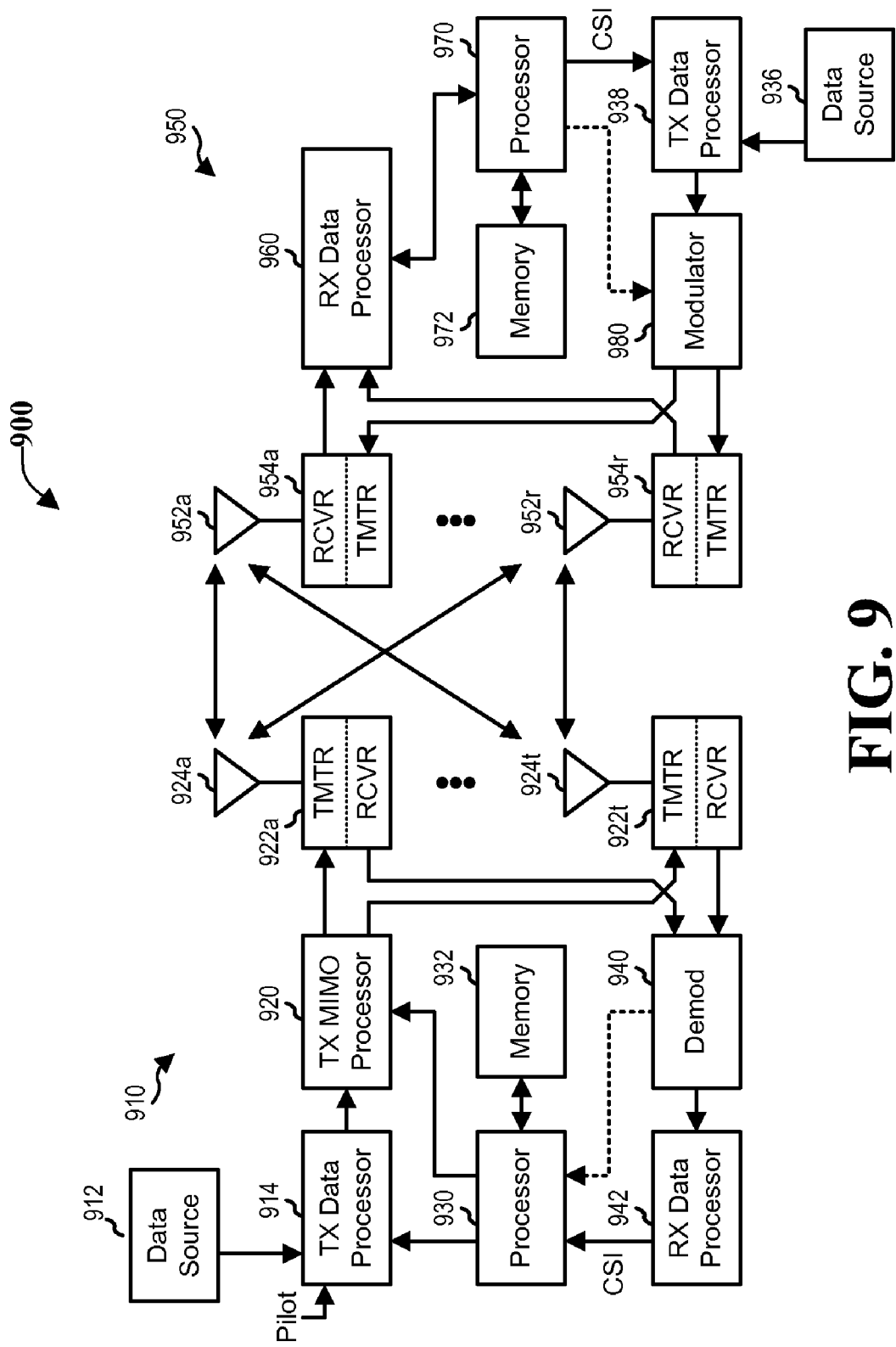
FIG. 9 illustrates a block diagram of an embodiment of a transmitter system and a receiver system

FIG. 9 illustrates a block diagram of an embodiment of a transmitter system 910 (also known as the access point) and a receiver system 950 (also known as access terminal) in a MIMO system 900. At the transmitter system 910, traffic data for a number of data streams is provided from a data source 912 to a transmit (TX) data processor 914.

In accordance with some aspects, each data stream is transmitted over a respective transmit antenna. TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 930.

The modulation symbols for all data streams are then provided to a TX MIMO processor 920, which may further process the modulation symbols (e.g., for OFDM). TX MIMO processor 920 then provides $N_T$ modulation symbol streams to $N_T$ transmitters (TMTR) 922a through 922t. In some embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 922a through 922t are then transmitted from $N_T$ antennas 924a through 924t, respectively.

At receiver system 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ receivers 954 based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910.

A processor 970 periodically determines which pre-coding matrix to use (discussed below). Processor 970 formulates a reverse link message comprising a matrix index portion and a rank value portion.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by transmitters 954a through 954r, and transmitted back to transmitter system 910.

At transmitter system 910, the modulated signals from receiver system 950 are received by antennas 924, conditioned by receivers 922, demodulated by a demodulator 940, and processed by a RX data processor 942 to extract the reserve link message transmitted by the receiver system 950. Processor 930 then determines which pre-coding matrix to use for determining the beamforming weights then processes the extracted message.

Figure 10:
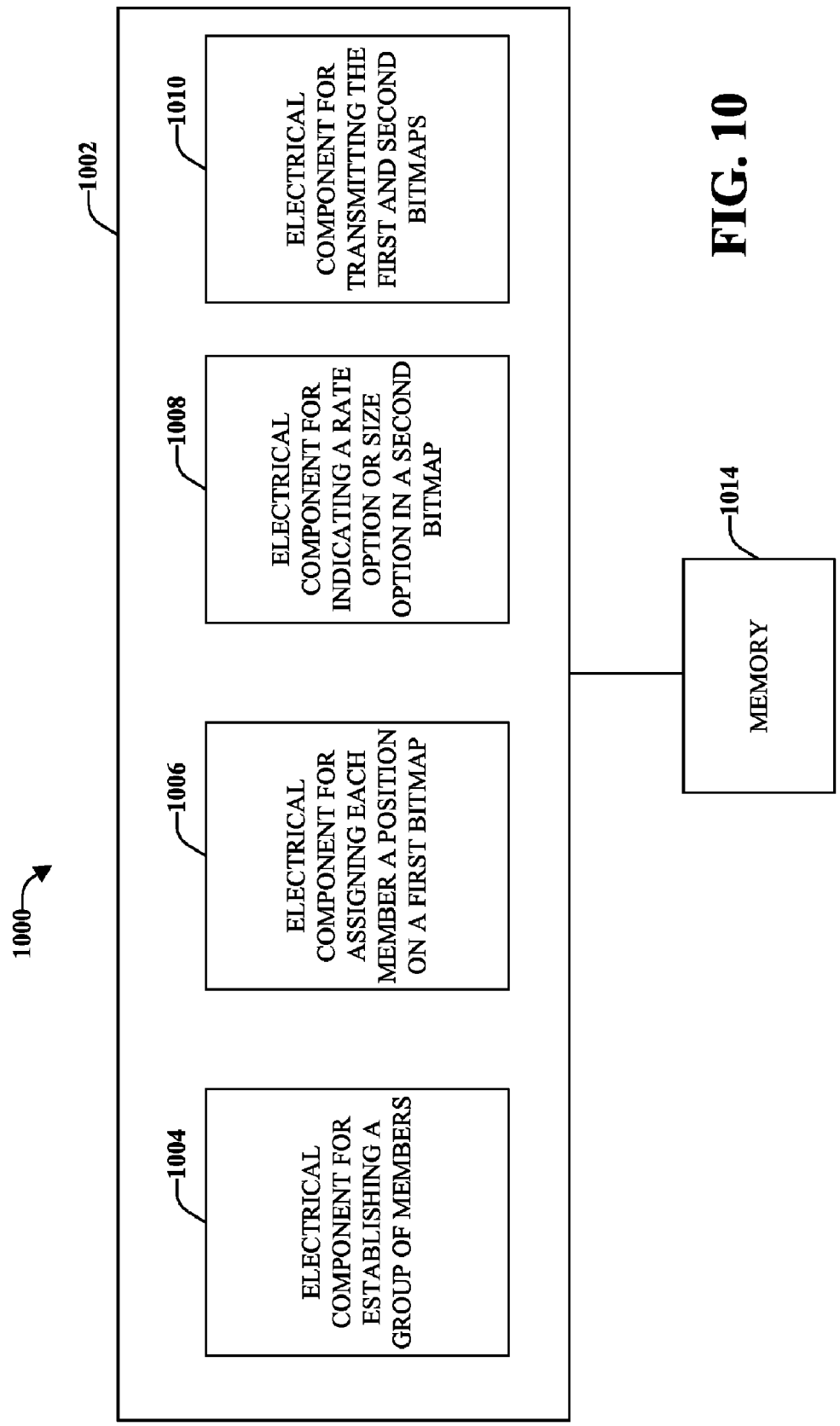
FIG. 10 illustrates an example system for group resource management.

FIG. 10 illustrates an example system 1000 for group resource management. For example, system 1000 may reside at least partially within an access point. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. For instance, logical grouping 1002 may include an electrical component for establishing a group of members 1004. Each member in the group can be a single user, identified by a MacID, or a multicast set of users, identified by a set of MacIDs. Also included is an electrical component for assigning each group member a position within a first bitmap 1006. The position in the bitmap can be assigned in a persistent fashion.

Also included in logical grouping 1002 may be an electrical component for indicating a rate option or a size option in a second bitmap as a function of a profile of each group member 1008. A rate profile per group member allows for multiple rate options. A size profile per group member allows for multiple assignment size options. Further, logical grouping 1002 can also include an electrical component for conveying the first bitmap and the second bitmap to the group 1010.

In accordance with some aspects, logical grouping 1002 can include an electrical component for estimating a channel for each sector based on the received pilots, an electrical component for generating a first bitmap equal to the number of group members, measured in bits and an electrical component for producing a second bitmap equal to the number of "on" bits in the first bitmap. The "on" bits in the first bitmap can indicate a packet for the member assigned to that bit.

Additionally or alternatively, logical grouping 1002 can include an electrical component for defining a group member index based on the position of each group member within the first bitmap. Also included can be an electrical component for indicating the rate option or size option in each x-bit position in the second bitmap. In accordance with some aspects, logical grouping 1002 can include an electrical component for indicating the absence of the second bitmap with a null size and an electrical component for assigning a default rate option or a default size option for each group member.

Additionally, system 1000 can include a memory 1012 that retains instructions for executing functions associated with electrical components 1004, 1006, 1008, and 1010 or other components. While shown as being external to memory 1012, it is to be understood that one or more of electrical components 1004, 1006, 1008, and 1010 may exist within memory 1012.

Figure 11:
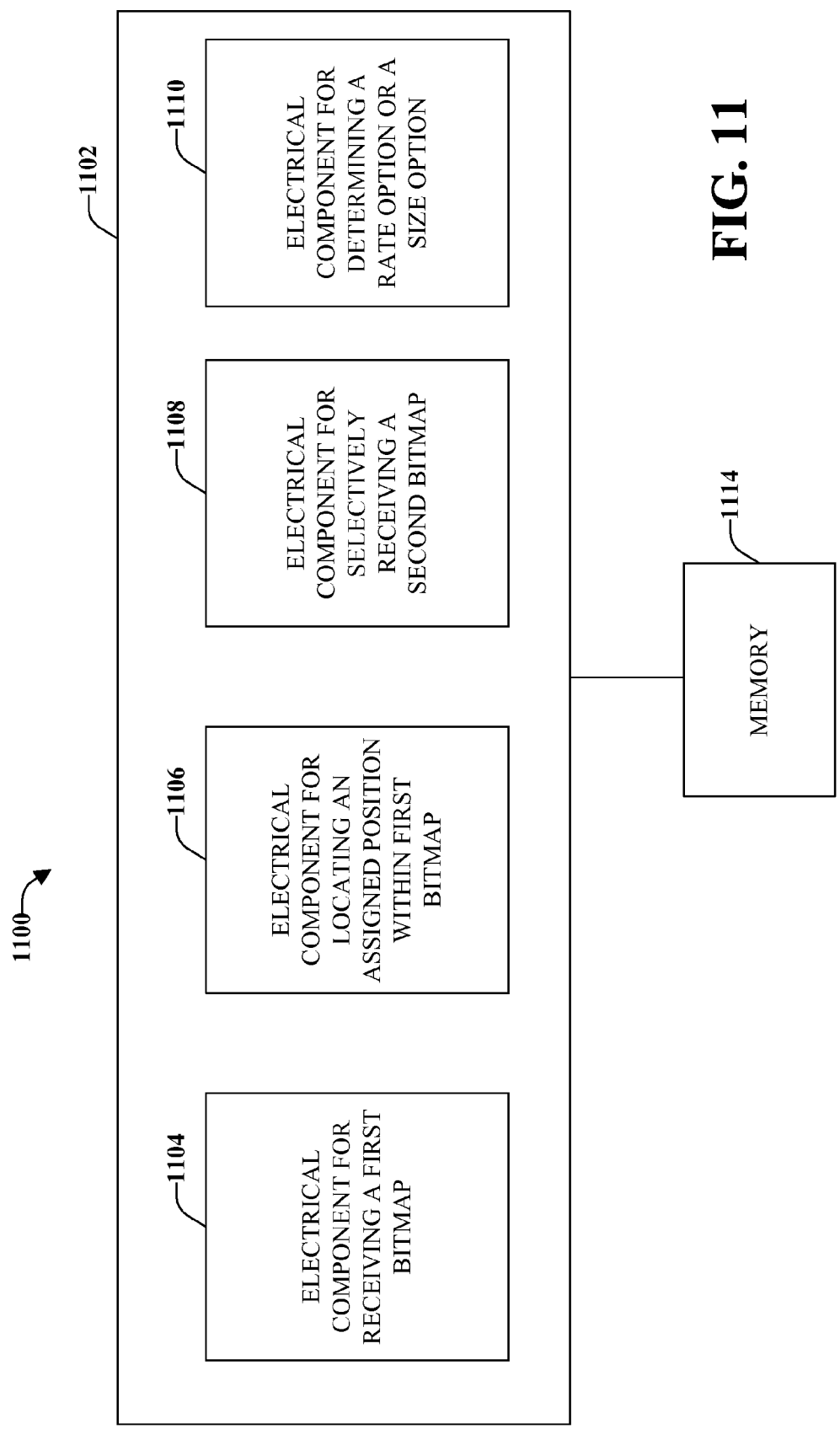
FIG. 11 illustrates an example system for group resource management.

FIG. 11 illustrates an example system 1100 for group resource management. For example, system 1100 may reside at least partially within an access terminal. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. For instance, logical grouping 1102 may include an electrical component for receiving a first bitmap in a VoIP frame 1104. The first bitmap can be intended for a group of user device members identified by a group identification. Also included is an electrical component for locating an assigned position with the first bitmap 1106. The position in the bitmap can be assigned in a persistent fashion.

Also included in logical grouping 1102 may be an electrical component selectively receiving a second bitmap 1008. If the corresponding position in the first bitmap is "1", the second bitmap is received. If the corresponding position in the first bitmap is "0", the second bitmap is ignored. Further, logical grouping 1102 can also include an electrical component for determining a rate option or a size option 1110. The rate or size option can be indicated in each x-bit position in the second bitmap. The rate profile can provide multiple rate option and the size profile can provide multiple assignment size options.

Additionally, system 1100 can include a memory 1112 that retains instructions for executing functions associated with electrical components 1104, 1106, 1108, and 1110 or other components. While shown as being external to memory 112, it is to be understood that one or more of electrical components 1104, 1106, 1108, and 1110 may exist within memory 1112.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for group resource management, comprising:
    creating a group of members, wherein each member comprises at least one user device;
    assigning each group member a position within a first bitmap in a persistent fashion;
    indicating either a rate option or size option in each of one or more fields of a second bitmap as a function of a profile of a group member corresponding to the field; and
    transmitting one or more signals through one or more antennas to the group, the one more signals being modulated by the first bitmap and the second bitmap.

2. The method of claim 1, after creating the group of members further comprising: creating a first bitmap equal to the number of group members, measured in bits; and creating a second bitmap equal to the number of "on" bits in the first bitmap.

3. The method of claim 2, the number of "on" bits in the first bitmap indicates a packet for the member assigned to the bit.

4. The method of claim 1, further comprises defining a group member index based, at least in part, on the position of each group member within the first bitmap.

5. The method of claim 1, further comprises indicating the rate option or size option in an x-bit position in the second bitmap, wherein the x-bit position corresponds to an "on" bit of the first bitmap.

6. The method of claim 1, wherein each group member can be a single user device or a multicast set of user devices.

7. The method of claim 1, further comprising: indicating an absence of the second bitmap with a null size; and assigning a default rate option or a default size option for each group member.

8. The method of claim 1, further comprises transmitting the first bitmap on a Shared Signaling Channel (F-SCCH) having its own index, wherein the F-SCCH index is transmitted as part of a group set-up message.

9. A wireless communications apparatus comprising a scheduler to assign channels between or among members of a group, each member comprising at least one user device, the scheduler comprising:
    a processor to execute instructions to assign a position in a first bitmap to each group member, include either a rate option or a size option in each of one or more fields of a second bitmap as a function of a profile of a group member corresponding to the field, and initiate transmission of the first bitmap and the second bitmap to the group; and
    a memory to store information generated by the processor.

10. The apparatus of claim 9, the processor further to execute instructions to create a first bitmap equal to the number of group members, measured in bits and generate a second bitmap equal to the number of "on" bits in the first bitmap.

11. The apparatus of claim 10, the number of "on" bits in the first bitmap indicates a packet for the member assigned to the bit.

12. The apparatus of claim 9, the processor further to execute instructions to define a group member index based, at least in part, on the position of each group member within the first bitmap.

13. The apparatus of claim 9, the processor further to execute instructions for to indicate the rate option or size option in an x-bit position in the second bitmap, wherein the x-bit position corresponds to an "on" bit of the first bitmap.

14. The apparatus of claim 9, wherein each group member can be a single user device or a multicast set of user devices.

15. The apparatus of claim 9, the processor further to execute instructions to indicate an absence of the second bitmap with a null size and assign a default rate option or a default size option for each group member.

16. The apparatus of claim 9, the processor further to execute instructions to indicate transmission of the first bitmap on a Shared Signaling Channel (F-SCCH) having its own index, wherein the F-SCCH index is transmitted as part of a group set-up message.

17. A wireless communications apparatus to facilitate group resource management, comprising:
    means for establishing a group of members, wherein each member comprises at least one user device;
    means for assigning each group member a position within a first bitmap;
    means for indicating either a rate option or size option in each of one or more fields of a second bitmap as a function of a profile of a group member corresponding to the field; and
    means for conveying the first bitmap and the second bitmap to the group.

18. The wireless communications apparatus of claim 17, further comprising: means for generating a first bitmap equal to the number of group members, measured in bits; and means for producing a second bitmap equal to the number of "on" bits in the first bitmap.

19. The wireless communications apparatus of claim 17, wherein an "on" bit in the first bitmap indicates a packet for the member assigned to the bit.

20. The wireless communications apparatus of claim 17, further comprising means for defining a group member index based, at least in part, on the position of each group member within the first bitmap.

21. The wireless communications apparatus of claim 17, further comprising means for indicating the rate option or size option in an x-bit position in the second bitmap, wherein the x-bit position corresponds to an "on" bit of the first bitmap.

22. The wireless communications apparatus of claim 17, wherein each group member is a single user device or a multicast set of user devices.

23. The wireless communications apparatus of claim 17, further comprising: means for indicating the absence of the second bitmap with a null size; and means for assigning a default rate option or a default size option for each group member.

24. An article comprising a non-transitory computer-readable medium having stored thereon machine-executable instructions that are executable by processor in a scheduler to assign channels between or among members in a group of member user devices to:
    generate a first bitmap equal to the number of group members, measured in bits assigning each group member a position within a first bitmap;
    produce a second bitmap having a size based, at least in part, on a number of "on" bits in the first bitmap indicating either a rate option or size option in each of one or more fields of the second bitmap as a function of a profile of a group member corresponding to the field; and
    initiate transmission of the first bitmap and the second bitmap to the group.

25. In a wireless communication system, a scheduler to assign channels between or among members of a group of members, each member comprising at least one user device, the scheduler comprising:
    a processor to:
    produce a first bitmap having a size based, at least in part, on a number of group members and assigning each group member a position within the first bitmap;
    generate a second bitmap having a size based, at least in part, on a number of "on" bits in the first bitmap indicating either a rate option or size option in each of one or more fields of the second bitmap as a function of a profile of a group member corresponding to the field; and
    communicate the first bitmap and the second bitmap to the group.

26. A method for selectively determining assigned resources, comprising:
    receiving one or more signals at one or more antennas being modulated by a first bitmap in a Voice Over Internet Protocol (VoIP) frame, wherein the first bitmap is intended for a group of user device members identified by a group identification;

locating an assigned position within the first bitmap;

selectively receiving at said one or more antennas one or more signals modulated by a second bitmap; and determining either a rate option or a size option included in a field of the second bitmap based in part on the assigned position within the first bitmap.

27. The method of claim 26, selectively receiving a second bitmap, comprising: determining if the assigned position within the first bitmap is set to "1" or "0"; and accepting the second bitmap if the assigned position is set to "1".

28. The method of claim 26, selectively receiving a second bitmap, comprising: determining if the assigned position within the first bitmap is set to "1" or "0"; and ignoring the second bitmap if the assigned position is set to "0".

29. The method of claim 26, wherein the rate option or size option is indicated in an x-bit position in the second bitmap, wherein the x-bit position corresponds to an "on" bit of the first bitmap.

30. The method of claim 26, wherein a rate profile provides multiple rate options based on a profile of a corresponding group member.

31. The method of claim 26, wherein a size profile provides multiple assignment size options based on a profile of a corresponding group member.

32. The method of claim 26, further comprising transmitting a Reverse Acknowledgement Channel (R-ACKCH) associated with a lowest NodeID at a base level within an assignment, wherein each base node on a forward link is associated with a R-ACKCH.

33. A wireless communications apparatus, comprising:
a processor to execute instructions to:
process a first bitmap in a Voice Over Internet Protocol (VoIP) frame, wherein the first bitmap is intended for a group of user device members identified by a group identification, each member comprising at least one user device, detect an assigned position within the first bitmap,
selectively process a second bitmap, and
identify either a rate option or a size option included in the second bitmap based in part on the assigned position within the first bitmap; and
a memory to store information generated by the processor.

34. The wireless communications apparatus of claim 33, the processor further to execute instructions to determine whether the assigned position within the first bitmap is set to "1" or "0" and accept the second bitmap if the assigned position is set to "1".

35. The wireless communications apparatus of claim 33, the processor further to execute instructions to determine if the assigned position within the first bitmap is set to "1" or "0" and ignore the second bitmap if the assigned position is set to "0".

36. The wireless communications apparatus of claim 33, wherein the rate option or size option is indicated in an x-bit position in the second bitmap, wherein the x-bit position corresponds to an "on" bit of the first bitmap.

37. The wireless communications apparatus of claim 33, wherein a rate profile provides multiple rate options based, at least in part, on a profile of a corresponding group member.

38. The wireless communications apparatus of claim 33, wherein a size profile provides multiple assignment size options based on a profile of a corresponding group member.

39. A wireless communications apparatus, comprising:
means for receiving a first bitmap in a Voice Over Internet Protocol (VoIP) frame, wherein the first bitmap is intended for use by a group of user device members identified by a group identification;
means for locating an assigned position within the first bitmap; and
means for selectively receiving a second bitmap; and
means for determining either a rate option or a size option included in the second bitmap based in part on the assigned position within the first bitmap.

40. The wireless communications apparatus of claim 39, the means for selectively receiving a second bitmap determines if the assigned position within the first bitmap is set to "1" or "0" and accepts the second bitmap if the assigned position is set to "1".

41. The wireless communications apparatus of claim 39, the means for selectively receiving a second bitmap determines if the assigned position within the first bitmap is set to "1" or "0" and ignores the second bitmap if the assigned position is set to "0".

42. The wireless communications apparatus of claim 39, wherein the rate option or size option is indicated in an x-bit position in the second bitmap, wherein the x-bit position corresponds to an assigned position within the first bitmap that is set to "1".

43. The wireless communications apparatus of claim 39, wherein a rate profile provides multiple rate options based on a profile of a corresponding group member.

44. The wireless communications apparatus of claim 39, wherein a size profile provides multiple assignment size options based on a profile of a corresponding group member.

45. An article comprising a non-transitory computer-readable medium having stored thereon instructions that are executable by a processor to:
process a first bitmap in a Voice Over Internet Protocol (VoIP) frame, wherein the first bitmap is intended for a group of user device members identified by a group identification;
locate an assigned position within the first bitmap;
selectively receive a second bitmap depending on whether the assigned position within the first bitmap is set to "1" or "0"; and
determine either a rate option or a size option included in the second bitmap based in part on the assigned position within the first bitmap, wherein the rate option or size option is indicated in an x-bit position in the second bitmap, wherein the x-bit position corresponds to an assigned position within the first bitmap that is set to "1".

46. In a wireless communication system, an apparatus comprising:
a processor to:
process a first bitmap in a Voice Over Internet Protocol (VoIP) frame, wherein the first bitmap is for a group of user device members identified by a group identification;
determine an assigned position within the first bitmap;
receive a second bitmap depending on whether the assigned position within the first bitmap is set to "1" or "0"; and
ascertain either a rate option or a size option included in the second bitmap based in part on the assigned position within the first bitmap, wherein the rate option or size option is indicated in an x-bit position in the second bitmap, wherein the x-bit position corresponds to an assigned position within the first bitmap that is set to "1".

* * * * *